United States Patent Office 2,826,600
Patented Mar. 11, 1958

2,826,600

PREPARATION OF THIOETHYL ISOPHTHALATES

George William Driver, Blackley, Manchester, England, assignor to Imperial Chemical Industries Limited, a corporation of Great Britain No Drawing. Application November 15, 1954
Serial No. 469,057

Claims priority, application Great Britain
December 7, 1953

4 Claims. (Cl. 260—455)

This invention relates to esters and more particularly it relates to an improved process for the manufacture of esters of the formula:

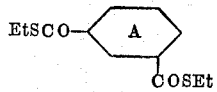

wherein the nucleus A may optionally bear additional substituents.

It has been described by Luckenbach (Berichte der deutschem Chemischen Gesellschaft, volume 17, page 1435) to prepare for example isophthalic acid thioethyl ester by aqueous hydrolysis of isophthalimidothioethylether.

I have found that this compound is much more readily produced, and in much better yield, by for example the interaction of isophthalyl chloride with ethyl mercaptan.

Thus according to our invention we provide a process for the manufacture of the above stated esters which comprises interaction of a compound of the formula:

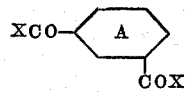

wherein X stands for a halogen atom and A has the meaning stated above with ethyl mercaptan.

The reaction is preferably carried out in the presence of alkali, for example in an aqueous solution of caustic soda.

The compounds with which this invention is concerned are, where the nucleus A bears additional substituents, new compounds.

Thus according to yet a further feature of the invention we provide new compounds of the formula

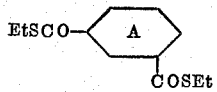

wherein the nucleus A bears additional substituents for example halogen atoms, nitro, amino and hydroxy groups.

Such compounds include for example diethyl 5-nitrodithiolisophthalate, B. P. 178–180° C. at 0.05 mm., diethyl 5-aminodithiolisophthalate, M. P. 108° C., diethyl 5-chlorodithiolisophthalate, and diethyl-4-hydroxydithiolisophthalate, M. P. 138–140° C.

The invention is illustrated but not limited by the following examples in which the parts are by weight:

Example 1

A solution of 25 parts of isophthalyl chloride in 30 parts of benzene is added during 15 minutes to a stirred solution of 19 parts of ethyl mercaptan dissolved in 140 parts of 2 N aqueous sodium hydroxide solution. The temperature is kept at 15–20° C. by cooling in an icebath. The mixture is then stirred for 30 minutes and the benzene layer is separated and washed with water. The benzene is then removed and the product is distilled under reduced pressure. There is obtained 24 parts of a colourless oil of B. P. 210°–212° C. at 15 mm. which is isophthalic acid thioethylester or diethyl dithiolisophthalate.

Example 2

10.6 parts of 5-nitroisophthalyl chloride and 20 parts of ethyl mercaptan are mixed and the mixture is heated at 100° C. under reflux until evolution of hydrogen chloride ceases. It is then dissolved in ether and the solution is washed with aqueous sodium bicarbonate solution, then with water and is finally dried over anhydrous sodium sulphate. The ether is distilled and the residue is then distilled under reduced pressure giving diethyl 5-nitrodithiolisophthalate as a liquid B. P. 178–180° C. at 0.05 mm.

Example 3

A mixture of 2 parts of 5-chloroisophthalic acid and 10 parts of thionyl chloride are heated under reflux until a solution is obtained. The mixture is then distilled under reduced pressure and the residue is added to a mixture of 3 parts of ethyl mercaptan and 15 parts of 2 N aqueous sodium hydroxide solution. The mixture is then shaken vigorously during one hour and is then extracted with benzene. The benzene extract is dried and the benbene is distilled to give diethyl 5-chlorodithiolisophthalate.

What I claim is:

1. A process for the manufacture of esters of the formula:

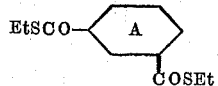

wherein the nucleus A is a monocyclic aromatic nucleus which comprises reacting a compound of the formula:

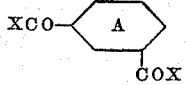

wherein X stands for a halogen atom and A has the meaning stated above, with ethyl mercaptan.

2. The process of claim 1 wherein the reaction is carried out in the presence of alkali.

3. The process of claim 2 wherein the alkali is caustic soda.

4. Process as claimed in claim 1 wherein the compound reacted with ethyl mercaptan is isophthalyl chloride.

References Cited in the file of this patent

UNITED STATES PATENTS

| | | |
|---|---|---|
| 2,426,276 | Meiser | Aug. 26, 1947 |
| 2,600,077 | Schmidt | June 10, 1952 |

OTHER REFERENCES

Chakravarti: Indian Chemical Society, Quarterly Journal, 1927, vol. 4, pages 141–148.

Marvel et al.: J. Am. Chem. Soc., vol. 73 (1951), pages 1100–1102.

Bavin: J. Pharm. & Pharmacology, vol. 4, No. 1, November 1952, pages 844, 845, 846.